United States Patent [19]

Stevens

[11] Patent Number: 5,011,207
[45] Date of Patent: * Apr. 30, 1991

[54] ROBOTIC END EFFECTOR FOR GRASPING OBJECTS

[76] Inventor: S. Scott Stevens, Rte. 1, Box 302A, Harriman, Tenn. 37748

[*] Notice: The portion of the term of this patent subsequent to Jan. 30, 2007 has been disclaimed.

[21] Appl. No.: 439,776

[22] Filed: Nov. 20, 1989

Related U.S. Application Data

[63] Continuation-in-part of Ser. No. 80,616, Aug. 3, 1987, Pat. No. 4,896,914.

[51] Int. Cl.⁵ ............................................. B25J 9/14
[52] U.S. Cl. .................................. 294/88; 294/119.1; 901/37; 901/39
[58] Field of Search .................. 294/88, 902, 119.1, 294/86.4, 98.1, 119.3; 269/266, 24; 901/30, 31, 37, 39

[56] References Cited

U.S. PATENT DOCUMENTS

| | | | |
|---|---|---|---|
| 2,399,824 | 5/1946 | Pressman | 269/266 X |
| 3,219,382 | 11/1965 | Hugentobler | 294/98.1 |
| 3,868,102 | 2/1975 | Pevar | 269/266 X |
| 4,047,709 | 9/1977 | Thyberg et al. | |
| 4,088,312 | 5/1978 | Prosch et al. | |
| 4,572,564 | 2/1986 | Cipolla | |
| 4,609,220 | 9/1986 | Scott | |
| 4,632,444 | 12/1986 | Martinez et al. | |

FOREIGN PATENT DOCUMENTS

| | | | |
|---|---|---|---|
| 626947 | 8/1978 | U.S.S.R. | 294/902 |
| 1342728 | 10/1987 | U.S.S.R. | 294/902 |

*Primary Examiner*—Johnny D. Cherry
*Assistant Examiner*—Dean J. Kramer
*Attorney, Agent, or Firm*—Pitts and Brittian

[57] ABSTRACT

A robotic hand to use as an end effector to grasp objects, either of regular or irregular configuration. Numerous embodiments are described: each embodiment includes a housing and a plurality of finger units that are deployed from the housing, with tips of fingers contacting the object at a sufficient number of points to support the object. Each finger unit is provided with a guide whereby the finger unit is constrained to move along a fixed path. Pneumatic, hydraulic and electromechanical deployment systems are typically used. Deployment is in unison, individually or in groups. The embodiments are of particular value when operated remotely, and where visual observation of an object is obscured.

2 Claims, 6 Drawing Sheets

ROBOTIC END EFFECTOR FOR GRASPING OBJECTS

REFERENCE TO PRIOR APPLICATIONS

This is a continuation-in-part patent application based upon parent application Ser. No. 80,616 filed Aug. 3, 1987, and now U.S. Pat. No. 4,896,914, issued Jan. 30, 1990.

TECHNICAL FIELD

This invention relates generally to devices for grasping objects and for use with remotely operated equipment. More specifically, the invention relates to a remotely-operated "robotic hand" or "end effector" for grasping an object.

BACKGROUND ART

In the remote manipulator art, numerous types of "hand" units have been devised for grasping an object to move that object from one location to another, to perform some operational task, etc. Most of these hand units (commonly called "end effectors") are simply a pair of fingers or tongs that move in a parallel relationship toward or away from each other. Typically, these tongs that are to grasp the object have a resilient surface to improve grasping friction, and some units provide for pressure-related feedback to insure proper grasping force.

In order to grasp an object using these devices of the prior art, the device must be seen either directly or through the use of video equipment so that a proper grasping location on the object is utilized to minimize inadvertent disengagement. For example, generally spherical objects must be grasped at a major diameter, necked-type objects grasped at the neck, etc. Where objects of a particular configuration are to be grasped routinely, tong units of a configuration matching the object can be used. Highly irregularly shaped objects, particularly those with sloped surfaces, are grasped with only great difficulty, perhaps after several attempts. Further, if the object is unknown in configuration when grasped, it must be directly or indirectly viewed to ascertain a proper location for grasping the same.

There are applications for remotely operated grasping devices where the object is only partially seen or even cannot be seen by conventional means. For example, in underwater exploration, the murky waters usually encountered prevent any viewing. Also, light distortion hampers exact positioning of the device. Thus, it becomes important that the object be grasped without such exact positioning.

Numerous special configurations of grasping means have been developed, some of which are designed to grasp objects of unusual exterior shape. One such device is described in U.S. Pat. No. 4,572,564, issued to T. M. Cipolla on Feb. 25, 1986. Other typical devices are described in U.S. Pat. No. 4,047,709, issued to B. S. J. Thyberg, et al. on Sept. 13, 1977; U.S. Pat. No. 4,632,444 issued to M. R. Martinez, et al., on Dec. 30, 1986; U.S. Pat. No. 4,088,312, issued to NASA on May 9, 1978; and U.S. Pat. No. 4,609,220, issued to P. B. Scott on Sept. 2, 1986. None of these devices are adapted for convenient use as a hand of a remotely operated grasping device.

The most pertinent of the prior art appears to be the patent to Cipolla ('564). The device shown therein has a pair of jaws that can be moved toward or away from each other. Each of the jaws has a plurality of "fingers" projecting from confronting surfaces, with these fingers being biased outwardly to an extreme deployed position. When the jaws are moved toward each other, any object positioned between the sets of fingers causes the fingers to be forced back into the jaws. This is a "passive" movement of the fingers. The position of the fingers, at maximum movement, is "locked" such that the jaws can be opened without the fingers returning to the extended position until intentionally released.

Another of the cited patents, that to Scott ('220), utilizes a plurality of finger units that depend from two jaws, with the jaws being movable toward and away from each other. As in the '564 reference, the fingers are normally biased to their fullest point of deployment and are moved only by the object that they encounter during movement of the jaws; i.e., again passive movement of the fingers. Due to the configuration of the finger units, many configurations of objects cannot be grasped by the device of this reference.

Accordingly, it is a principal object of the present invention to provide a hand unit for a remotely operated device, said hand providing a capability to grasp a surface having either a regular or irregular configuration.

It is another object of the invention to provide a device which can grasp an object and then reorient the object into a selected new orientation.

A further object of the present invention is to provide a grasping unit to be utilized as an end effector of robotic equipment wherein a housing is provided that will store a plurality of finger units until a selected portion thereof are intentionally deployed from the housing whereby a distal end of at least a portion of the deployed fingers grasp the surface of an object for the intended purpose.

Also, it is an object of the present invention to provide a housing of fixed configuration that defines a working volume that will accept at least a portion of an object to be grasped, the housing having a plurality of finger units that can be deployed from a stored position within the housing into the working volume whereby the distal end of at least some of the fingers contact the surface of the object to grasp the same.

These and other objects of the present invention will become apparent upon a consideration of the drawings referred to hereinafter in combination with the detailed description thereof.

DISCLOSURE OF THE INVENTION

In accordance with the present invention, there is provided a unit for grasping or engaging the surface of an object. More specifically, the preferred embodiment of the device has a housing member that defines a gap to at least partially receive the object and a plurality of fingers that can be moved, from a stored position within the housing, out of the housing into that gap to grasp an object of any surface configuration from at least two generally opposite sides. The fingers are constrained to move in a direction along their central axes (i.e., one degree of freedom); however, they can have any appropriate cross-sectional configuration. The fingers can be either individually or collectively moved out of the housing to grasp the surface of the object. Hydraulic, pneumatic, or electromechanical means are preferably used for this movement. In the event that shape determination is desired, the apparatus disclosed in the above-cited U.S. Pat. No. 4,896,914 can be used.

BEST MODE FOR CARRYING OUT THE INVENTION

Figure 1:
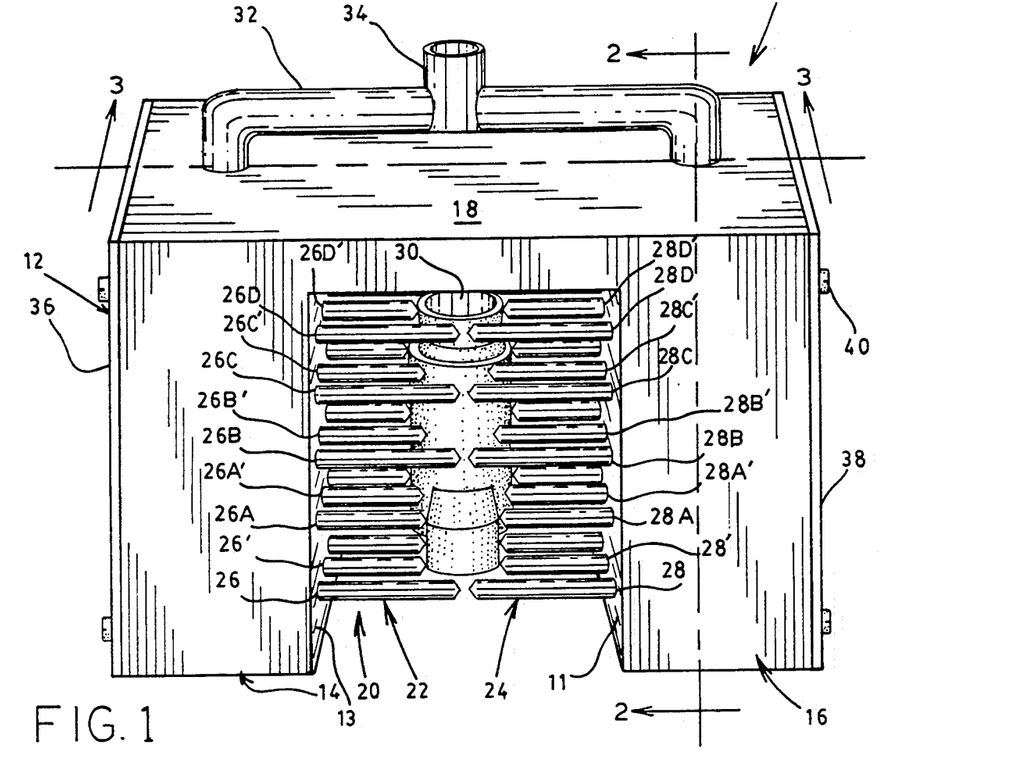
FIG. 1 is a frontal isometric view of a device embodying principles of the present invention, the device is shown as engaging the surface of an irregularly shaped object.

Shown generally at 10 in FIG. 1 is a frontal perspective view of one embodiment of a device that embodies the principles of the present invention. This embodiment has a housing 12 formed of two side chambers 14, 16 fixedly joined by a top support 18. These chambers, having opposing faces 11, 13, define an object-receiving opening or gap 20. This opening or gap can be also referred to as a "working volume" to at least partially receive the object to be grasped. Extendable from each of the side chambers 14, 16 are a plurality of finger arrays 22, 24, respectively. These fingers (also referred to hereinafter as finger units) are arranged in a selected array as, for instance, confronting groups of fingers in a plurality of rows and columns as illustrated. Thus, a finger 26 of one array confronts finger 28 in the opposing array. Of course other arrays can be utilized as well as non-confronting relationships. For purposes of explanation, fingers in a column are, for example, identified as 26, 26A, 26B, 26C, 26D. In a row, the fingers are identified as 26, 26', etc., in one row, and 26A, 26A', etc., in the next row with corresponding identification.

Similarly, the fingers in array 24 are identified as 28, 28A-D, and 28', and 28A-D', etc., as shown. Depicted in this view is an object (e.g., a hollow vessel) 30 grasped by this embodiment of the invention.

As will be discussed in more detail hereinafter, the fingers of the arrays 22, 24 are piston-like elements that can be moved by "active" means in fixed paths axially along their individual long axes. This embodiment of FIG. 1 (and FIGS. 2 and 3) utilizes fluid (gas or liquid) pressure applied to the interior of side chambers 14, 16 through a header 32 which is attached to conduit 34. Of course, the top support 18 can be used as the header if desired. Application of pressure through the conduit 34 and header 32 causes the finger arrays 22,24 to be moved from stored positions within the chambers 14,16 toward and possibly contact and grasp the object 30. It can be seen, for example, that fingers 26 and 28 do not contact the object and neither do fingers 26B, 28B, 26D and 28D. Certain of the other fingers do not travel a full distance before they contact the object. It can be seen that if the pressure is retained, the object is securely held and can be moved from place to place by moving the device 10. Reversing the pressure, i.e., making the pressure within the side chambers 14, 16 less than the exterior pressure, causes the fingers of each array 22,24 to withdraw from the object and retract into their respective chambers. This illustrated embodiment has removable end covers 36, 38 on the side chambers 14, 16 which are typically retained with screws 40. Of course, it will be understood that the chambers can be formed with other constructions suitable for the various applications of the device 10.

Figure 2:
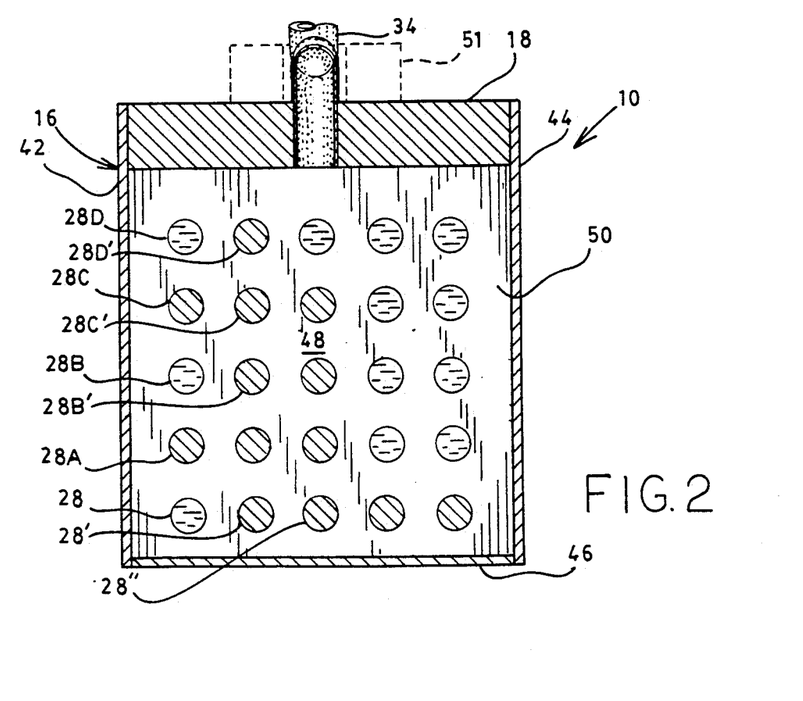
FIG. 2 is a vertical section of the device of FIG. 1 taken at 2—2 thereof.

Referring now to FIG. 2, this is a vertical section taken at 2-2 of FIG. 1. Thus, it can be seen that side chamber 16 is formed by the aforementioned top support 18 together with walls 42, 44, 46, 48 (and the cover 38). These walls and cover define a cavity 50 surrounding the fingers, with the fingers penetrating the wall 48. Since fingers 28, 28B and 28D, for example, are fully extended into the opening 20 (see FIG. 1), the ends of these fingers are visible in this cross-section. However, fingers 28', 28A, 28A', etc., are not fully extended and thus the plane of the cross-section passes through these fingers as shown. Although the rear portion of the object 30 cannot be seen in FIG. 1, the position of the rearward fingers of row 28, 28', 28'', etc., indicates that the object 30 has a projection at the rear against which these fingers are contacted. In this FIG. 2, shown in phantom lines, is a collar 51 useful for mounting the present invention to a manipulator arm, for example. Other appropriate mounting means can, of course, be utilized.

Figure 3:
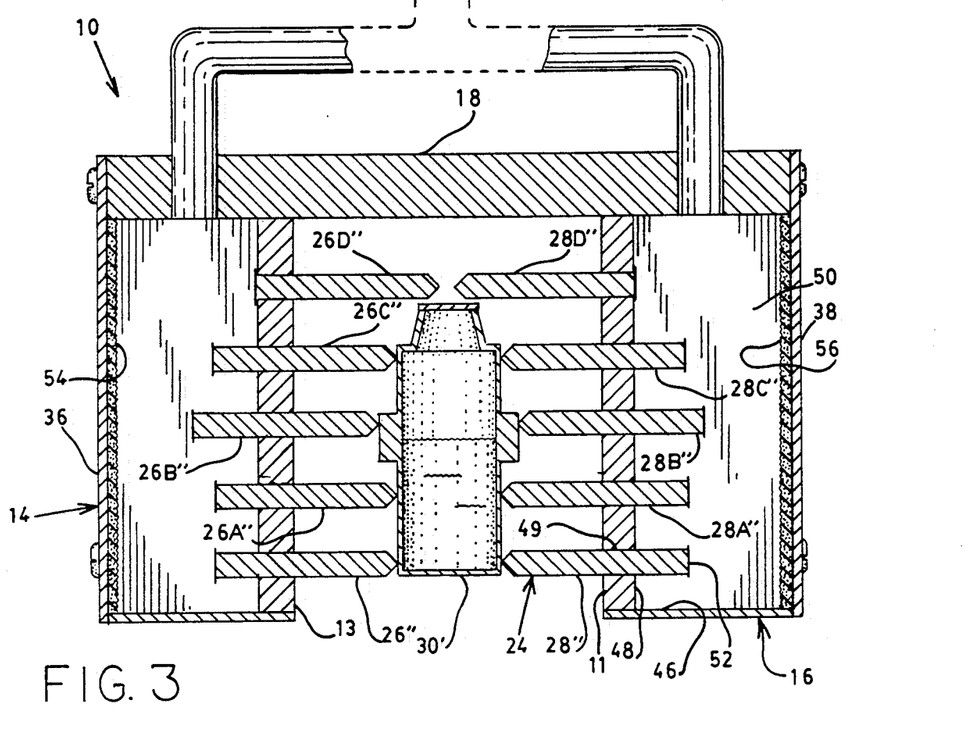
FIG. 3 is a vertical section of the device of FIG. 1 taken at 3—3 thereof except with an object of a different external shape.

FIG. 3 is a vertical cross-sectional view of the device of FIG. 1 taken at 3—3 therein. Illustrated is an object 30' of a different configuration, however, to further illustrate movement of the fingers. It can be seen that, for example, the fingers of array 24 pass through closely fitting openings 49 in the wall 48 (the structure in side chamber 14 is identical). These openings define "guide means" whereby the finger units move along fixed paths. Each finger can have a slightly enlarged head 52 as indicated on finger 28''. This prevents loss of a finger from the side chamber 16. Of course, other restraining means can be used. Resilient pads 54, 56 are shown as attached to the inner wall of covers 36, 38, respectively. These provide cushioning as the fingers are withdrawn into the side chambers 14, 16.

Figure 9:
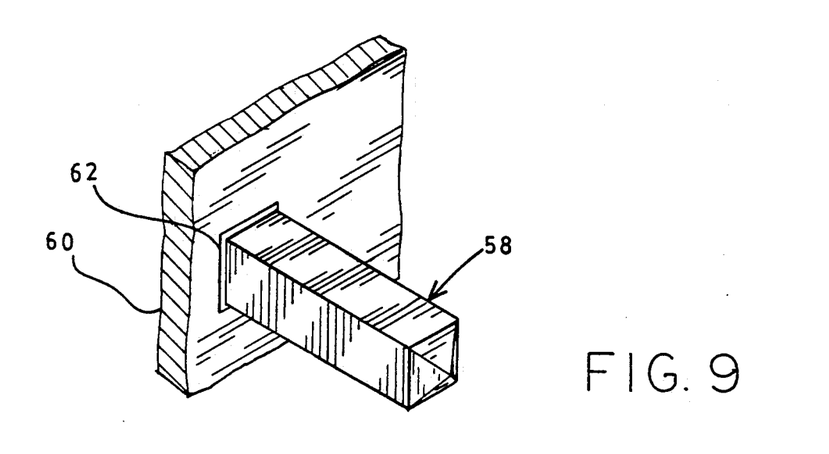
FIG. 9 is a perspective drawing of a finger useful in the present invention, the finger having a rectangular cross-section.

Prior to a discussion of other embodiments of a total device of the present invention, it should be understood that the fingers as illustrated in the figures can have other cross-sectional shapes. One such alternative cross-section is illustrated at 58 in FIG. 9; e.g., rectangular or square in cross-section. This is shown passing through a support wall (guide) 60, with a seal 62 surrounding the finger to minimize leakage around the finger. When perfectly linear motion is to be utilized, and no rotation is required, the fingers can have other cross-section such as triangular, cross-shaped, oval, etc.

Referring again to FIG. 1, the operation of this embodiment will be explained. By reducing the pressure within the chambers 14, 16 relative to the external pressure, all fingers of each array 22, 24 are substantially fully withdrawn into the chambers 14, 16 with only the most extreme end protruding into the opening 20. The device is placed over the object 30. There is no need for the object to be centered or oriented vertically as shown, i.e., it can have any position or orientation within the gap 20. When the object is in the opening 20, pressure is applied to the interior of the chambers 14, 16 and the fingers move out along their fixed paths to contact the object 30 in the manner illustrated. The object can be released by reducing the pressure to again withdraw the fingers into the chambers 14, 16. This is referred to herein as applying a "reverse pressure".

In the embodiment of FIGS. 1-3, the fingers are extended in unison by applying the same pressure against all of the fingers. Thus, it can be seen that the fingers are moved in an active manner in contrast to the passive movement taught in the prior art. Similarly, they are withdrawn in unison by applying the same reverse pressure to all of the fingers. Furthermore, these fingers are shown as only being supported by one wall (other guide means could be added). While this construction is suitable for certain applications of the present invention, other applications may preferably require individual finger operation and/or greater support. Finger units to accommodate this individual movement and additional support and guidance are illustrated in FIGS. 10 and 11.

Figure 10:
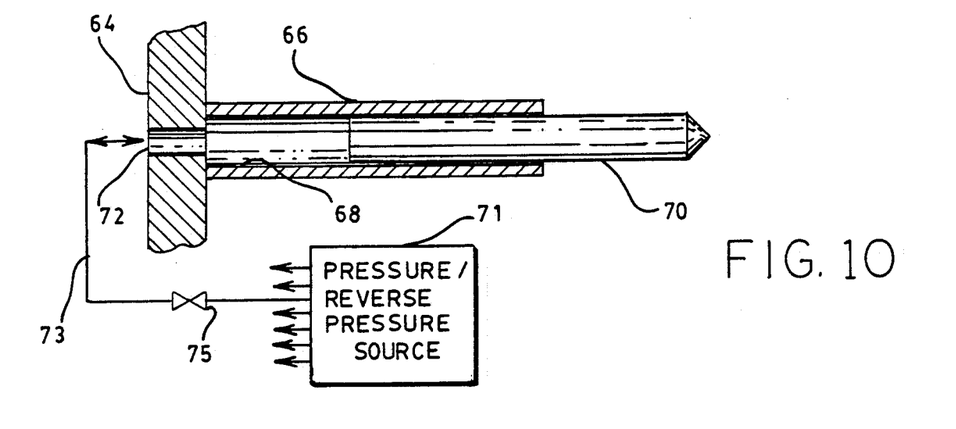
FIG. 10 is a fragmentary drawing illustrating an alternative support for an axially moving finger and a means for individual finger movement if desired or necessary.

Referring first to FIG. 10, a portion of a support wall 64 is illustrated. Mounted from this wall is a finger support and guide sleeve 66 defining an internal cylindrical recess 68. Fitting within this recess 68 is a piston-like finger 70. The wall is provided with an opening 72 communicating with the recess 68 whereby a pressure (or reverse pressure) from a source 71, applied through the opening, causes the finger to move axially in the recess. Alternatively, rather than an opening through the support wall, the wall 64 can be imperforate and an opening can communicate with the recess 68 near the wall. In either construction, a separate feed line 73 with appropriate valving 75, can communicate with the opening such that the valving can control the application of pressure (or reverse pressure) to individual or sub-groups of cylindrical recesses and thereby affect selective movement of individual fingers or groups of fingers.

Figure 11:
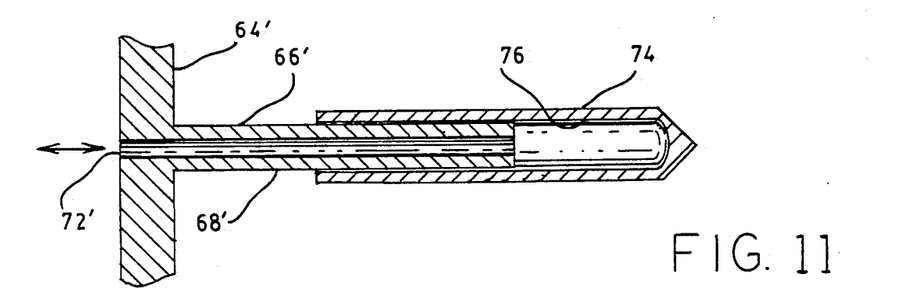
FIG. 11 is a fragmentary drawing illustrating a further alternative support for an axially moving finger and means for individual finger movement if desired or necessary.

The finger embodiment of FIG. 11 provides the same support, guidance and individual actuation in a slightly different manner. In this embodiment, a support wall 64' carries a support tube 66' having a substantially axial passageway 68'. Communication with this passageway is through opening 72' (or an opening through the wall of support tube 66'). Surrounding the support tube 66' is a piston-like finger 74 that defines a cylindrical recess 76 to receive the support tube. As in the embodiment of FIG. 10, individual connection can be made to a source of pressure (and reverse pressure) to selectively provide for individual finger movement in an array of fingers.

Figure 4:
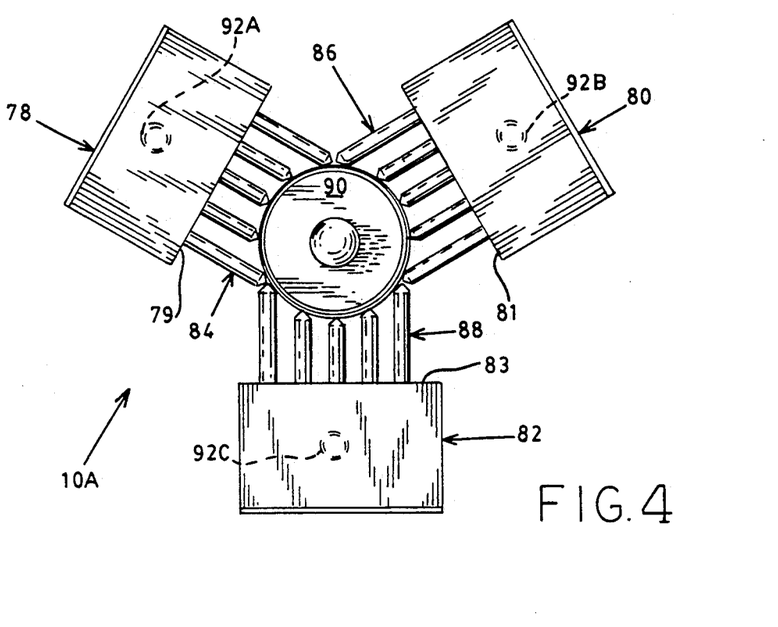
FIG. 4 is a bottom view of another embodiment wherein three sets of a plurality of fingers are utilized to grasp an object generally centered therebetween.

In FIG. 4, another embodiment 10A of the present invention is illustrated. This embodiment functions in a manner similar to that of FIGS. 1-3 but is constructed utilizing three chambers 78, 80 and 82 defining opposing faces 79, 81 and 83, respectively, each chamber having an array of fingers 84, 86 and 88, respectively. Since this is a bottom view of the device 10A, the other fingers in the columns of the arrays are not visible. These arrays are illustrated in a position to grasp a generally cylindrical object depicted at 90. Although not shown, the chambers are mounted to an appropriate frame or support to form a housing whereby the positional relationship of the chambers remains fixed. Further, it will be understood that the chambers can have alternative positional relationship to each other rather than the equal angular (120 degree) relationship that is illustrated. Each of the chambers is provided with a port 92A, 92B, 92C for the application of pressure or reverse pressure for effecting axial movement of the fingers in each array. It will also be understood that an embodiment of the present invention can have a greater number of chambers if desired. Furthermore, it will be understood that the constructions illustrated in FIGS. 10 and 11 are also applicable to this embodiment of FIG. 4.

Figure 5:
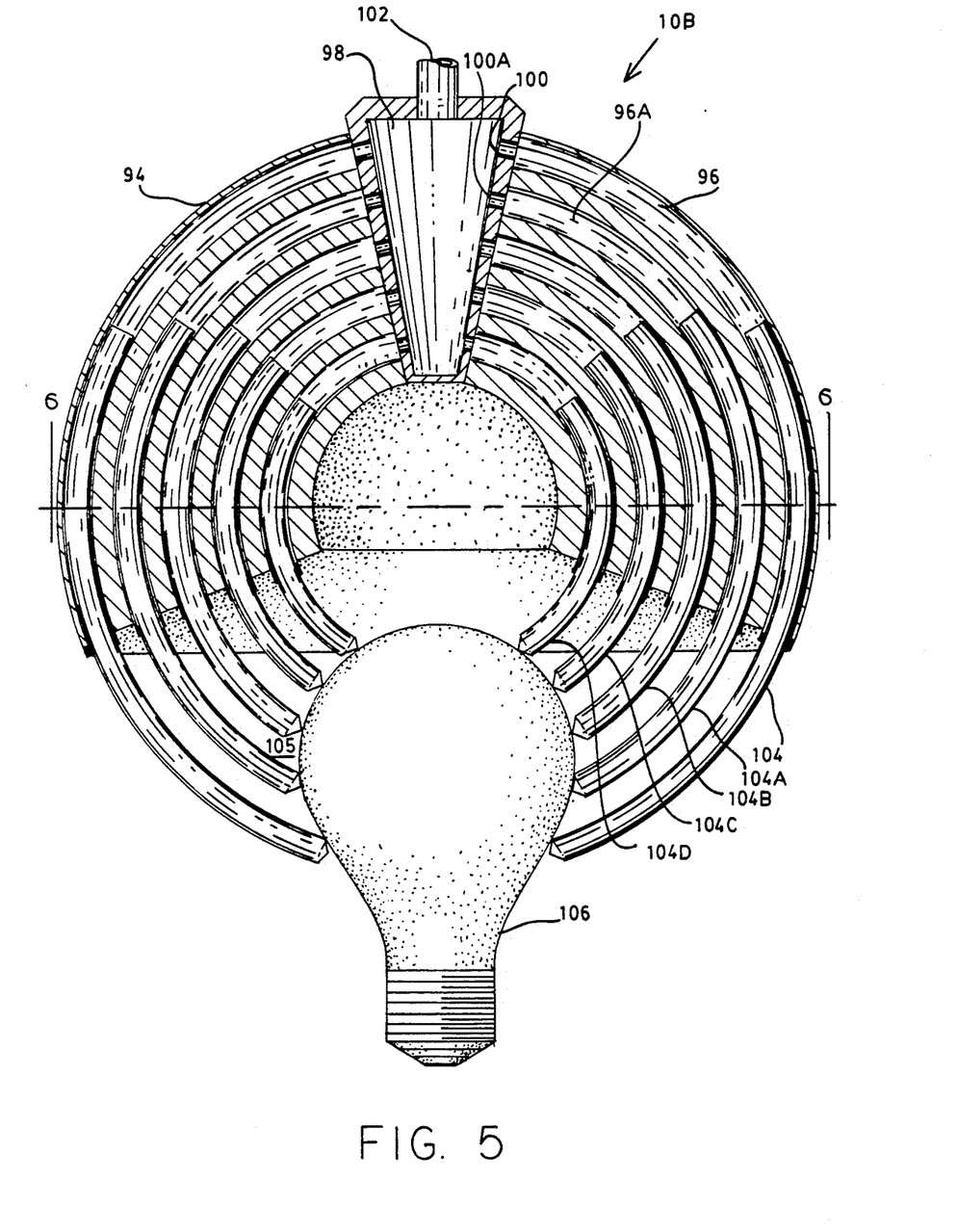
FIG. 5 is a vertical cross-section through a substantially spherical grasping device according to the present invention wherein the fingers move along segments of circular paths toward and away from an object.

Referring now to FIG. 5, shown therein at 10B is a generally hemispherical grasping device (a generally hemi-cylindrical device could utilize substantially the same construction). This represents an infinite number of opposing faces. This embodiment is fabricated from a body (housing) 94 that defines a plurality of cavities 96, 96A, etc., the cavities being along the circumference of circular paths having a center of the body 94 as their centers. Each of these cavities communicate with a common header 98 through openings 100, 100A, etc., in a manner similar to the construction of FIG. 9. A port 102 is provided to apply pressure or reverse pressure to the header and thus to the cavities. Positioned within each cavity is a finger such as 104, 104A, etc., of circular cross-section, with these fingers adapted to move with one degree of freedom along their long axes in fixed paths as established by the cavities. Thus, they can be substantially withdrawn into the body 94 or extended from the body into a region 105 corresponding to the remainder of a sphere (or cylinder) to grasp an object, such as at 106. For clarity in this drawing, fingers that are in a rearward portion of the body 94 (if hemispherical) are not shown.

Figure 6:
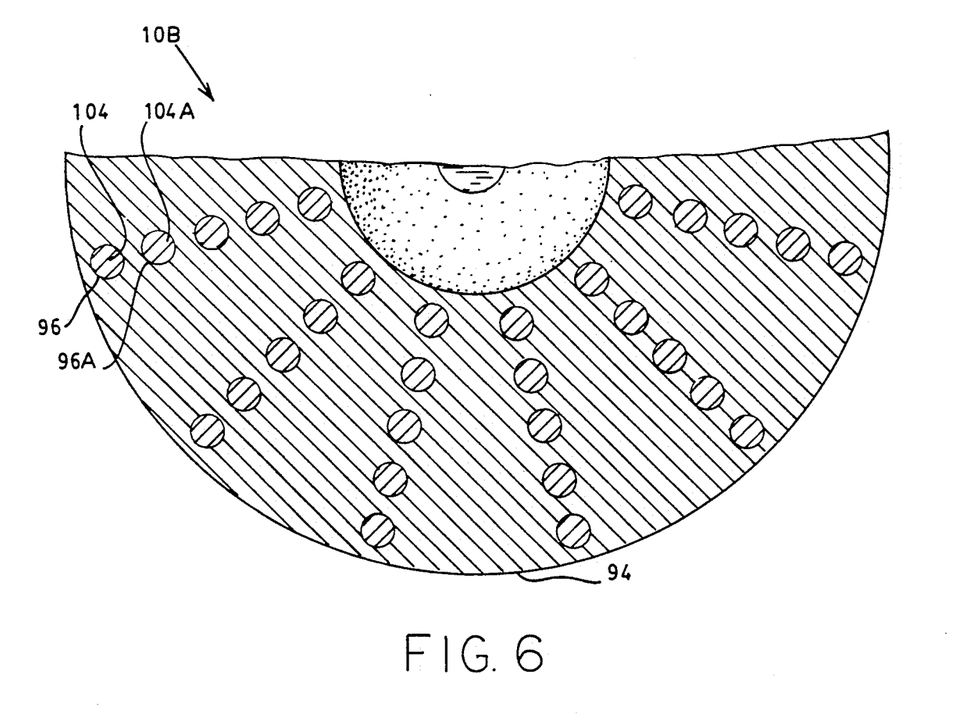
FIG. 6 is a transverse sectional drawing of the embodiment of FIG. 5 taken at 6—6 thereof.

A transverse cross-sectional view of the embodiment 10B, taken at 6—6 in FIG. 5, is illustrated in FIG. 6. Only approximately one-half of the total cross-section is shown: the remaining portion is a mirror image of that shown. In this view, the other cavities and corresponding fingers are illustrated whereby a symmetrical array is depicted. In this embodiment 10B, all finger units have the same cross-sectional size. The angular relationship of "columns" of fingers is illustrated as being about 30 degrees; however, any other selected uniform or nonuniform relationship can be used that will provide fingers to grasp the object to achieve the desired operation.

Figure 7:
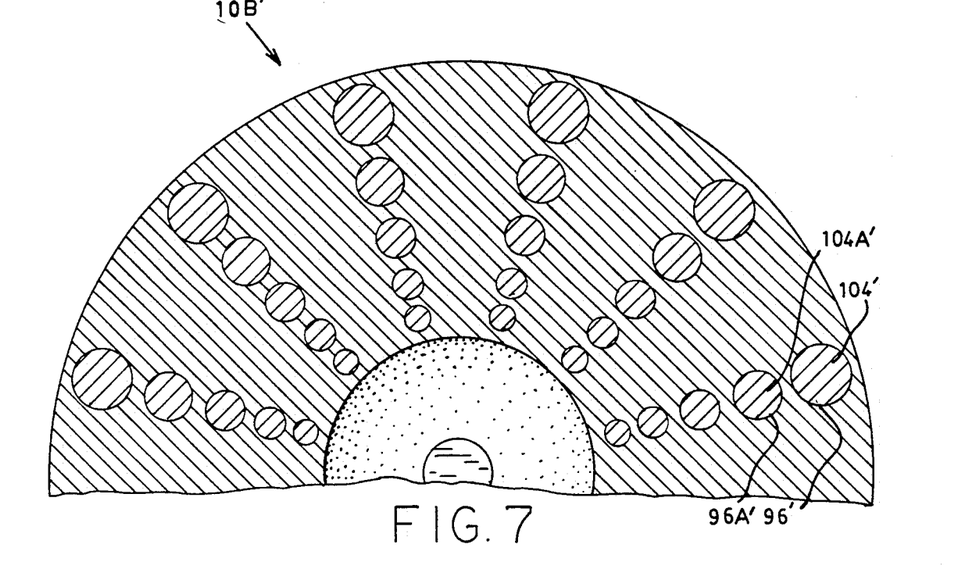
FIG. 7 is a transverse sectional drawing of an embodiment similar to that of FIG. 5 except that the cross-sectional area of the fingers decreases for the inner units to thereby permit use of a larger number of fingers if desired or necessary.

FIG. 7 is similar to FIG. 6 in that it is a partial cross-sectional view of an embodiment 10B' that is similar to embodiment 10B. The only change is a variation of the diameter of the cavities (e.g., 96', 96A', etc.) and their respective fingers (e.g., 104', 104A') from a central portion to an outer portion. This structure permits use of a greater number of "columns" of fingers within a device of a given size where desired or necessary.

Figure 8:
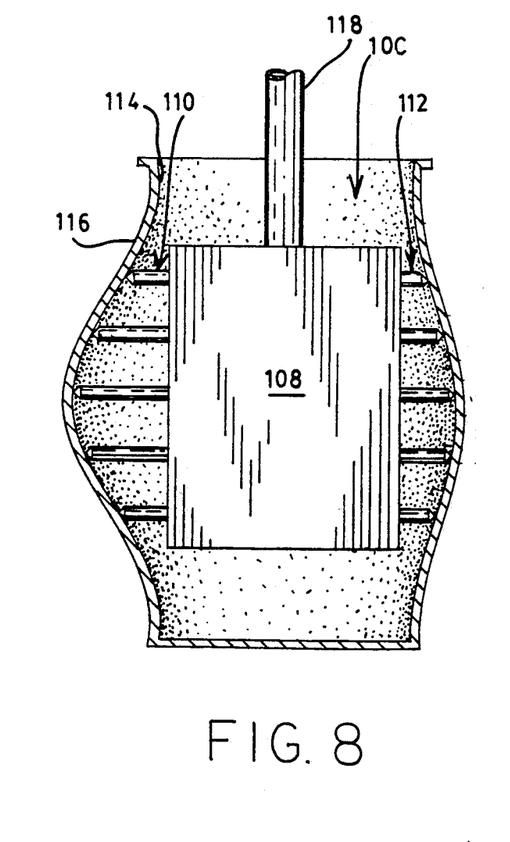
FIG. 8 illustrates an embodiment of the present invention constructed so as to grasp the inner surface of an irregularly shaped hollow object.

In some applications, it may be desirable to grasp the inner surface of a hollow object having an opening leading to that inner surface. An embodiment of the present invention for such applications is illustrated at 10C in FIG. 8. This embodiment has a body 108 from which finger arrays 110, 112 project in opposite directions so as to contact the inner surface 114 of an object 116. Only one column of fingers in arrays 110, 112 are illustrated; however, additional columns probably would be utilized to grasp the surface 114. As in other embodiments, pressure or reverse pressure is applied to the body 108 through conduit 118 to effect axial movement of the fingers.

In the embodiments described hereinabove, the fingers of the robotic devices are actuated by fluids via pneumatic or hydraulic systems. The particular choice of a gas or liquid, respectively, is somewhat dependent upon the environment in which the device is used. When used in air, for example, air can be used as the operating fluid. Similarly, in a water environment, water is a suitable fluid. Of course, these are not the only fluids to use in these environments, and a person skilled in the art can make a proper selection. Further, there are some environments where leakage of the fluid around the fingers is not detrimental; in other uses, a seal can be used (as in FIG. 9) if leakage is to be prevented.

Figure 12:
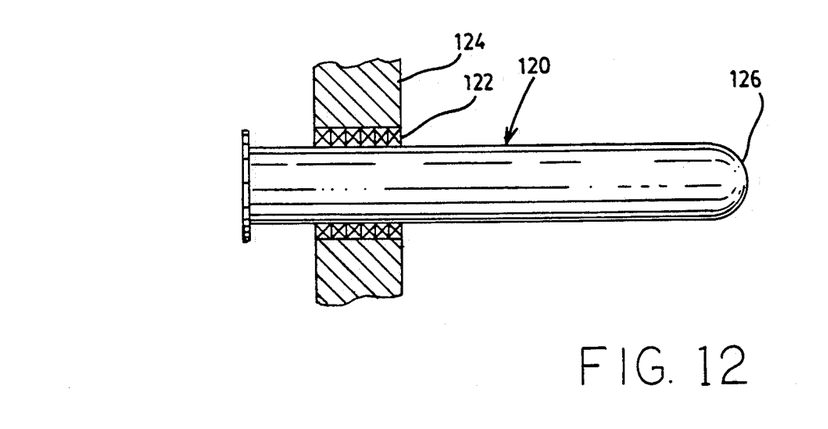
FIG. 12 is a drawing illustrating the use of linear motor principles for the purpose of axially moving individual fingers of an embodiment of the present invention.

The present invention is not limited to fluid operation of the fingers. For example, a finger unit embodiment such as illustrated at 120 in FIG. 12 can be used. This is a linear motor wherein sequential electrical energization of coils 122 in or near a support wall 124 causes the finger 120 to be moved axially relative to the wall. The finger 120 is shown in FIG. 12 to have an alternately configured contacting distal end 126 as compared to the contacting end of previously illustrated finger units. Although a sharply pointed contacting end is generally preferred when the object to be grasped has a highly irregular surface, objects having more regular surfaces, e.g., nearly rectangular or cylindrical, can be grasped with a finger tip of other configuration.

Referring again to the matter of individual or sub-group active operation of the finger units (see FIGS. 10, 11, 12), this construction provides for a further advantage of the present invention. For example, there can be applications where the object being grasped in the robotic hand is to be realigned from its grasped position. This might involve realigning a bolt for properly engaging a threaded receptor. This can be accomplished by withdrawing a selected portion of the finger units and extending other finger units, without fully releasing the object, such that the position of the object is shifted into the desired alignment.

Having described fully the construction of several embodiments of the present invention, it will be understood by those skilled in the art that the present invention has numerous applications for which there are currently is no known device having comparable capabilities. For example, in underseas exploration where the water is often murky, the present invention can be used to grasp an object of unknown configuration without a complete visual observation. Similar grasping of objects can be accomplished in other environments where there are hazards or handicaps for an individual. Further, when the fingers are individually provided with active movement means, objects held by the present device can be reoriented while still being grasped in order to facilitate placement of the object. This, then, adds another degree of movement that is not possible with conventional remotely-operated manipulators. Although the general purpose of the embodiments of the present invention is to grasp an object for the purpose of moving that object, the invention can also be used to grasp a fixed object so as to "anchor" any apparatus associated with the end effector. The components can be very small to accommodate handling small objects, or can be rather large for correspondingly large objects.

I claim:

1. A device for grasping an object having a surface, which comprises:

a substantially hemispherical housing defining a central cavity for at least partially receiving said object;

a plurality of arcuate finger units carried by said housing, said finger units each having a distal end for engaging said surface, and a further end positioned within said housing, said plurality of finger units being sufficient in number to support said object when said object is grasped by said distal ends of said finger units;

guide means for each of said finger units, said guide means providing for movement of said finger units along fixed arcuate paths relative to said housing into and out of said central cavity; and movement means operatively associated between said housing and each of said finger units for selective reciprocative movement of said finger units along their individual axes in said fixed arcuate paths from a first position substantially stored within said housing to a second position within said central cavity to engage said surface of said object with said distal ends, and for selective movement to return to said first position and release said surface of said object.

2. A robotic end effector for grasping an object having an external surface, which comprises:

a housing having spaced--apart first and second chambers that each define an interior volume and further define a working volume between said first and further chambers for at least partially receiving said object;

a plurality of finger units arranged in a plurality of rows and columns and carried by each said first and second chambers, said finger units carried by said first chamber being substantially opposed to said finger units carried by said second chamber, said finger units being substantially elongated cylinders with a central axis, each finger unit having a substantially conical distal end with a centrally positioned apex for engaging said surface, and with a further end positioned within said chambers, said finger units being movable along fixed paths from within said chambers into said working volume;

guide means for each of said finger units, said guide means restricting movement of said finger units too said fixed paths; and movement means operatively associated with each said first and second chambers to effect reciprocative movement of said finger units in said fixed paths along their individual axes from a first position substantially stored within said first and second chambers to a second position extending into said working volume, said movement means having apparatus for selectively applying positive and reverse fluid pressure against said further ends of said finger units to effect said reciprocative movement.

* * * * *